United States Patent [19]

Thomas

[11] 3,791,808

[45] Feb. 12, 1974

[54] METHOD FOR PRODUCING GLASS CERAMICS

[75] Inventor: Ian M. Thomas, Temperance, Mich.

[73] Assignee: Owens-Illinois, Inc., Toledo, Ohio

[22] Filed: Dec. 23, 1971

[21] Appl. No.: 211,760

[52] U.S. Cl............................ 65/30, 65/33, 106/52, 252/313 S
[51] Int. Cl............................................. C03b 29/00
[58] Field of Search... 65/33, 30, 134; 106/52, 38.3; 252/313 S

[56] References Cited
UNITED STATES PATENTS

| | | | |
|---|---|---|---|
| 3,640,093 | 2/1972 | Levene et al. | 65/134 |
| 3,423,216 | 1/1969 | Somers | 106/38.3 X |
| 3,493,341 | 2/1970 | Page et al. | 65/33 UX |
| 3,647,489 | 3/1972 | McMillan et al. | 65/33 X |

FOREIGN PATENTS OR APPLICATIONS

| | | | |
|---|---|---|---|
| 406,958 | 5/1967 | Australia | 65/33 |

OTHER PUBLICATIONS

Glastechnische Berichte, Vol. 44, Hefji, Jan. 1971, pp. 1-8.

Primary Examiner—Robert L. Lindsay, Jr.
Assistant Examiner—Kenneth M. Schor
Attorney, Agent, or Firm—Robert F. Rywalski

[57] ABSTRACT

There is disclosed a process for the preparation of glass ceramics from a thermally crytallizable oxide product which is formed by hydrolysis and condensation reactions and wherein the oxide product is produced and is converted to a glass ceramic at temperatures below the normal liquidus or normal melting temperature of an oxide composition corresponding to the oxide composition of the oxide product.

17 Claims, No Drawings

METHOD FOR PRODUCING GLASS CERAMICS

This invention relates to the preparation of glass ceramics and, more particularly, it relates to a method of preparing glass ceramics from a product of wet chemistry hydrolysis and condensation reactions.

The prior art is well aware of methods for producing glass ceramic articles from a thermally crystallizable glass. According to these methods, mixtures of the appropriate ingredients, most typically, oxides, but also including compounds which will convert to an oxide, such as, sulfates and carbonates, are admixed in a dry form, after which time they are heated to an elevated temperature to produce a pool of molten glass. The molten glass is formed into a desired article, which article is then subjected to controlled crystallization under appropriate conditions of time and temperature. The crystallization is generally obtained by a controlled cooling of the thermally crystallizable glass article so as to form the desired glass ceramic product. It will thus be seen that according to the prior art techniques, it is necessary to heat individual oxides of the desired thermally crystallizable glass to a temperature above the liquidus, or to a suitable melting temperature, to produce a molten thermally crystallizable glass which serves as the starting point in the fabrication of glass ceramics. In accordance with the present invention, glass ceramics are formed generally by a solid state reaction and there is no need to form a molten pool of the thermally crystallizable glass. Those skilled in the art will readily appreciate the significance and the advantages of now being able to form glass ceramic articles without the prior art melting step.

Thus, in accordance with the present invention, there is provided a process for forming a glass ceramic comprising thermally crystallizing a thermally crystallizable oxide product having the composition of the desired glass ceramic, said product being prepared by (1) hydrolyzing a silicon alkoxide of the formula $SiX_nY_{4-n}$, wherein X is hydrogen, phenyl or alkyls of one to six carbon atoms, Y is OR where R is an alkyl of one to six carbon atoms and wherein $n$ is 0 or 1, with less than a stoichiometric quantity of water in the presence of an effective catalytic amount of an acid hydrolysis catalyst so as to prepare a clear solution of a partially hydrolyzed silicon alkoxide; (2) reacting the partially hydrolyzed product according to the sequence of A plus B, A plus C, or B alone, so as to prepare a gel:
  A. a metal alkoxide so as to form a clear solution of a soluble further-hydrolyzable metallosilioxane,
  B. an aqueous solution of a metal compound which is convertible to a metal oxide so as to initially form a clear solution which subsequently converts to a clear gel,
  C. a quantity of water sufficient to hydrolyze residual alkoxy groups in the metallosiloxane so as to initially form a clear solution which subsequently converts to a clear gel,
(3) heating the gel so as to substantially remove organic and free liquid components therefrom and convert said gel to said product, said product being formed at and said thermal crystallizing being done at temperatures below the normal liquidus temperature of an oxide composition corresponding to the oxide composition of said thermally crystallizable product. According to a highly preferred feature, the thermally crystallizable oxide product is a particulate mass in which the particles have a size less than about 0.2 microns. According to another feature of this invention, this particulate mass is consolidated into a unitary body, using conventional ceramic techniques for forming such bodies, and the unitary body thermally crystallized to a glass ceramic under appropriate conditions of time and temperature.

According to another feature of this invention, there is provided a process for forming glass ceramic articles, which comprises: consolidating particles of thermally crystallizable oxide product into a unitary body, wherein the product is prepared by:
  1. hydrolyzing a silicon alkoxide of the formula $SiX_nY_{4-n}$, wherein X is hydrogen, phenyl or alkyls of one to six carbon atoms, Y is OR where R is an alkyl of one to six carbon atoms and wherein $n$ is 0 or 1, with less than a stoichiometric quantity of water in the presence of an effective catalytic amount of an acid hydrolysis catalyst so as to prepare a clear solution of a partially hydrolyzed silicon alkoxide;
  2. reacting the partially hydrolyzed product according to the sequence of A plus B, A plus C, or B alone, so as to prepare a clear gel:
    A. a metal alkoxide so as to form a clear solution of a soluble further hydrolyzable metallosiloxane,
    B. an aqueous solution of a metal compound which is convertible to a metal oxide, so as to initially form a clear solution which subsequently converts to a clear gel,
    C. a quantity of water sufficient to hydrolyze residual alkoxy groups in the metallosiloxane so as to initially form a clear solution which subsequently converts to a clear gel,
  3. converting said gel to said thermally crystallizable oxide product having a size of less than about 0.2 microns;

heating said body to a temperature and for a time sufficient to thermally crystallize said thermally crystallizable product to a glass-ceramic, said process being performed at temperatures below the normal melting temperature of an oxide composition corresponding to the composition of said oxide product. Advantageously, the conversion of the gel to the particulate oxide product will be effected by drying of the gel so as to remove free liquid components therefrom such as, for example, free water and alkanol (by-product of hydrolysis reactions) to produce a dried gel which is extremely friable, and then the dried gel is gently crushed or broken up to a particle size of less than about 0.2 microns followed by heating the crushed and dried gel to a temperature sufficient to remove residual organic components therefrom. The organic components which are removed may include residual alkoxy groups, small amounts of tightly bound alkanol, and organics from the metal compounds employed.

Yet according to another feature of this invention, there is provided a process for forming a glass ceramic comprising:
  A. consolidating particles having a size less than about 0.2 microns of thermally crystallizable oxide product into a unitary body, said product being prepared by steps which comprise:
    1. combining a silicon alkoxide of the formula $SiX_nY_{4-n}$, wherein X is hydrogen, phenyl or alkyls of one to six carbon atoms, Y is OR wherein R is an alkyl of one to six carbon atoms, and $n$ is 0 or 1, with less than a stoichiometric quantity of water in the presence of an effective catalytic amount of an acid hydrolysis catalyst so as to form a clear solution of a partially hydrolyzed silicon alkoxide having residual OR groups, 2. reacting said clear solution of a soluble, partially hydrolyzed silicon alkoxide with a metal alkoxide so as to form a clear solution of a soluble, further hydrolyzable metallosiloxane, 3. reacting said clear solution of a soluble, further hydrolyzable metallosiloxane with an additional quantity of water, said additional quantity of water being sufficient to hydrolyze said further hydrolyzable metallosiloxane so as to initially form a clear solution which converts to a clear gel structure containing a cross-linked metallosiloxane, 4. drying the gel, 5. crushing the dried gel so as to produce a particulate mass having a particle size of less than about 0.2 microns, 6. heating said particulate mass to a temperature of about 300°C. to about 500°C. for at least about 1 hour so as to remove residual organic components therefrom and form said oxide product, B. heating said body to a temperature and for a time sufficient to thermally crystallize said thermally crystallizable product to a glass-ceramic, said process being performed at temperatures below the normal melting temperature of an oxide composition corresponding to the composition of said thermally crystallizable oxide product.

According to another feature, there is contemplated herein that at least part of the additional water which is reacted in step 3 is a water solution of a metal compound which is convertible to a metal oxide.

As used herein, the term "normal liquidus" or "normal melting temperature" means the liquidus or melting temperature of an oxide composition, corresponding to the composition of the oxide product as provided herein, when made or evaluated by conventional techniques, i.e., melting a solid admixture of the respective oxides of the composition (or compounds which supply the respective oxides, for example, sulfates, carbonates or the like).

As indicated hereinbefore, a silicon alkoxide of the formula $SiX_nY_{4-n}$, is hydrolyzed with less than a stoichiometric quantity of water in the presence of an effective catalytic amount of an acid hydrolysis catalyst so as to prepare a clear solution of a soluble, partially hydrolyzed silicon alkoxide. According to a highly preferred feature of this invention a silicon alkoxide of that type is hydrolyzed with about 0.9 to about 1 equivalent (mole) of water per equivalent (mole) of silicon alkoxide. Generally, an excess of water should not be used so as to avoid interference with subsequent processing reactions. This, for example, may occur when an excess of a stoichiometric amount of water is employed; that is, when $n$ is 0 in the above silicon alkoxide, 2 equivalents (moles) of water per equivalent (mole) of alkoxide, or an excess of 2, should not be employed and, in fact, slightly lesser amounts may cause difficulties, and when using a silicon alkoxide of the type indicated above, wherein $n$ is 1, excesses of about 1.5 equivalents (moles) of water per equivalent (mole) of silicon alkoxide should be avoided. Usually, in order to form the clear solution of the partially hydrolyzed silicon alkoxide, at least about 0.3 equivalent of water per equivalent of silicon alkoxide will be employed. According to a highly preferred embodiment, $n$ will be 0 and about 0.3 to about 1.5 equivalents (moles) of water per equivalent (mole) of silicon alkoxide will be used. Likewise, the hydrolyzing of the silicon alkoxide to form the clear solution of the partially hydrolyzed silicon alkoxide will be effected in the presence of a suitable acid hydrolysis catalyst, such as, for example, the mineral acids, including hydrochloric acid and nitric acid, or a Lewis acid catalyst, which comprises compounds of a transitional element, such as zirconium or titanium, or compounds of a nontransitional element, such as aluminum. The hydrolysis catalyst will be employed in an effective catalytic amount, which amount generally will be about 1 to about 500 parts by weight per million parts by weight of the silicon alkoxide.

Advantageously, especially when using a silicon alkoxide of the formula $SiX_nY_{4-n}$, wherein, $n$ is 0, the hydrolysis of this silicon alkoxide to form the clear solution of the partially hydrolyzed silicon alkoxide will be effected in the presence of an organic solvent. Suitable solvents may, for example, be mono, di, and trihydric alcohols, like the alkylene glycols, for example, ethylene or hexylene glycol, and the like, including the monoalkyl ethers of dihydric alcohols, cyclic ethers like dioxane and tetrahydrofuran and other water-soluble organic solvents, including the $C_1$ to $C_6$ alkyl alcohols. The $C_1$ to $C_3$ alkyl alcohols, for example, ethanol, normal propanol, and isopropanol, are especially highly preferred.

Among the advantages offered by the gel technique as described herein is the ability of this technique to provide for exact stoichiometry in the selected composition and also the ability to provide for an ultra-high purity composition. The latter can be conveniently realized by selecting, or controlling, the purity level of the starting ingredients.

The metal oxide components for the thermally crystallizable oxide product can be introduced into the process in the form of a suitable metal oxide forming compound such as a metal alkoxide and/or metal salt. Metal as used herein is defined as comprising all of the metals listed in the Periodic Table including the so-called metal-like elements, for example the metalloids. It is preferred that the metal oxide-forming compound be added in the process as the alkoxide, rather than as the salt, and especially in the form of an alkoxide which is volatile and which can be easily purified by distillation. Examples of metals often employed in glass ceramic compositions which can be added in this way include Al Ti, Zr, and Sn. Other metal oxides which may be desired as a constituent of a glass ceramic, which can be added as the alkoxides, are the metals of Ge, Hf, Th, V, Nb, Ta, B, and P. Exemplary of the metal alkoxides contemplated for use are metal alkoxides of the formula $M(OR')_x$ wherein X is an integer depending upon the valence of the metal or cation M and R' is an alkyl of one to six carbon atoms. Other exemplary alkoxides include the double metal alkoxides generally of the formula $M_1M_2(OR)_x$ wherein $M_1$ and $M_2$ are metals, R is an alkyl of one to six carbon atoms, and wherein X is an integer dependent upon the combined valences of $M_1$ and $M_2$. Suitgel. Another method of converting the gel to the oxide product is by simply heating the gel under conditions of temperature and time sufficient to remove organic and free liquid components therefrom. According to a highly preferred embodiment, the gel will first be dried by heating to temperatures up to on the order of about 200°C., but, more typically, between about 50 and 150°C. for a time sufficient to evaporate the volatiles from the gel, after which time the dried gel, which is also an extremely friable material, is then gently crushed or broken up to a particle size of less than about 0.2 micron and, more typically, less than about 0.1 micron to produce a particulate mass. This mass is then heated to a temperature sufficient to remove residual organic components therefrom. Typically, the organic components are removed by heating to temperatures on the order of about 300°C. to about 500°C. for at least about 1 hour, with a more typical heating period being somewhere around 400°C. for several hours. The particle size remains substantially the same during this heating.

The preferred thermally crystallizable oxide product having particle sizes less than about 0.2 micron may be directly thermally crystallized to a glass-ceramic or, according to another embodiment, this particulate oxide product is consolidated into a unitary body, and the unitary body then thermally crystallized to a unitary glass-ceramic body. When crystallizing the particulate mass, the particles will form a glass-ceramic of substantially the same extremely small particle size as that of starting oxide product. This provides for a particulate mass of a glass-ceramic having extremely small particle size and a quite narrow size distribution, the size distribution and particle size itself being much smaller than that obtainable by conventional practices wherein a glass-ceramic is formed and then the glass-ceramic subjected to severe and intense conditions of grinding to convert it to a particulate mass. The extremely small particle size, narrow size distribution glass-ceramics provided herein are highly advantageous for use wherein particulate glass-ceramics have been employed before; they will provide quite outstanding results in such applications as fillers for glasses, for example, a filler in sealing glasses, and also in the area of use as tooth fillings.

Conventional consolidating techniques for fabricating unitary bodies in the ceramic industry may be employed. Exemplary of these consolidation techniques are wet and dry pressing, including isostatic pressing, both free mold and fixed mold, slip casting, plastic forming, extrusion forming, for example the tape process, and the like. In passing, it should be pointed out that one of the surprising advantages of using the small particle size oxide product is the ability of this product to be directly dry-pressed into extremely strong bodies; that is, there is no need to use a binder to provide these strong bodies. It should also be pointed out that small particle size glass ceramics, such as that obtainable by severely ball milling glass ceramic materials made by conventional prior art techniques, cannot be dry-pressed into strong bodies such as those obtainable by this invention. After consolidating the thermally crystallizable oxide product into a unitary body, the body is then subjected to appropriate temperatures and time to effect the controlled crystallization of the thermally crystallizable precursor according to procedures known in the art. Of course, if the precursor has been fabricated into a unitary body employing wet techniques, such as for example slip casting, the volatiles, for example water, will be allowed to evaporate prior to or substantially concurrently with the heating of the unitary body to effect the crystallization. The consolidated unitary body may, in general, be treated according to one of two modes, one of which will produce a dense body, that is, a body having a density of at least about 95 percent and, more typically, 98 or 99 percent of the theoretical density, and the other producing a porous body, such as, for example, a body having a porosity of up to about 50 percent and, more typically, 20 to about 40 percent. In order to produce a dense, glass-ceramic body, the unitary body is heated to a time and temperature insufficient to cause significant or appreciable crystallization, which time and temperature will result in a densification of the body; after the densification substantially ceases or the desired density is obtained, the densified unitary body is then subjected to conditions of time and temperature to obtain the desired crystallization and formation of the glass ceramic body. As used herein, appreciable or significant crystallization generally means less than about 5 or 10 percent as measured by X-ray diffractometer. In order to convert the unitary body into a porous glass-ceramic body, the unitary body will be heated under conditions of time and temperature such that appreciable or significant crystallization occurs before densification is completed. It will thus be seen that when heating the unitary body, there will be a tendency for the body to increase in density and thus, by regulating the time and temperature of heating, the density, or porosity, can be controlled. Once an appreciable or significant amount of crystallization has taken place, further densification essentially ceases. As indicated above, densities on the order of at least 95 percent and, more typically, 98 or 99 percent of theoretical, are obtainable. By theoretical is meant the density which is obtained by conventional techniques, that is, by melting an appropriate batch to form a pool of molten, thermally crystallizable glass, which glass is then formed into the desired article and then cooled down under controlled conditions to produce the resultant glass ceramic article. The dense bodies have a surface which is non-porous and may be used as dinnerware, heat exchangers, and the like. The porous glass-ceramic as produced herein is especially useful as a filter.

The temperatures and times employed to controllably thermally crystallize the thermally crystallizable oxide product, in accordance with this invention, will be routinely selected by those skilled in the art. While the conditions of time and temperature are dependent and, likewise, these conditions will also depend on the size of the article employed, it may be stated that temperature generally between about 800°C. and about 1,200°C. will be employed, with the times varying generally with the size of the article.

The following is presented in order to enable those skilled in the art to more easily make and use the present invention. It is understood, however, that this is merely exemplary and is not to be construed as limiting the invention.

EXAMPLE 1

A thermally crystallizable, oxide product having the following theoretical oxide composition was prepared as set forth below:

able double alkoxides include compounds of the formula $MgAl_2(OR')_8$ and $CaAl_2(OR')_8$ wherein $R'$ is an alkyl of one to six carbon atoms. The following metals, often employed in glass-ceramic compositions in the form of the oxide, in general, do not form suitable volatile alkoxides and it will be convenient to add them in the form of metal compounds which are convertible to metal oxides: Li, Na, K, Mg, Ba, Ca, and Zn. If it is desired that the glass-ceramic include oxides of the following metals, it will generally be preferred that they be added in the form of a salt as opposed to the alkoxide, Rb, Cs, Cu, Sr, Fe, Co, Ni, Zn, Cd, and rare earths La to Lu inclusive.

The metal compounds are preferably added in the form of an aqueous solution and include those soluble metal compounds which are convertible to oxides below about 600°C. and preferably in the range of about 300 to about 500°C. and which aqueous solutions combine with the partially hydrolyzed silicon alkoxide and/or soluble, further hydrolyzable metallosiloxanes to form a clear solution which converts to a clear gel. Highly preferred metal compounds are metal nitrates and metal acetates. Other suitable salt solutions are those containing soluble metal salts of organic acids including benzoic acid or other aromatic acids, fatty acids, alcohol acids, phenol acids, and oxalic acids. Suitable soluble salts of organic acids include salts of formic, citric, propionic, tartaric, although acetic acid is highly preferred. In general, the aliphatic acids having from one to 20 carbon atoms and aromatic acids having from seven to 15 carbon atoms are suitable. Chlorides and sulfates generally are not preferred because they typically leave residues, although they may be employed if a high purity composition is not needed. Carbonates and bicarbonates are also satisfactory. For further particulars on the gel technique reference may be had to U.S. Ser. No. 843,777.

The specific ingredients employed herein will be routinely selected by those skilled in the art so as to provide a gel having a composition, based on the equivalent oxide content of the ingredients, of a thermally crystallizable glass. Any of the numerous known, thermally crystallizable glass compositions may be produced as the oxide product, as provided herein, and this product then controllably crystallized, under appropriate conditions of time and temperature, to convert the product to a glass-ceramic without the necessity of forming a molten mass. Typically, these thermally crystallizable glasses have a base composition and include effective nucleating amounts of nucleating agents such as, for example, titania and/or zirconia, and they may likewise include other additives or modifiers. Exemplary compositions are found in U.S. Pat. No. 2,920,971 and others. Highly preferred thermally crystallizable glass compositions which are formed into a thermally crystallizable oxide product in accordance with the present invention are the thermally crystallizable lithia-aluminosilicate systems and the magnesia-aluminosilicate systems. Highly preferred lithia-aluminosilicate systems are those wherein the molar ratios of lithia to alumina to silica are in the range of between about 1:1:2 to about 1:1:15. Most desirably, the oxide product will be formed in accordance with this invention so as to have a composition corresponding to a thermally crystallizable lithia-aluminosilicate composition wherein the molar ratios of lithia to alumina to silica are between about 1:1:3 to about 1:1:8.

The oxide product, of course, will also include an effective nucleating amount of an appropriate nucleating agent such as, for example, titania or zirconia or mixtures thereof. Advantageously, the nucleating agent will be a mixture of $ZrO_2$ & $TiO_2$ generally in the range of 3 to 6 percent by weight although satisfactory results are also obtained with amounts as low as about 2.5 percent and as high as 7 or 8 or more. The amount of titania preferably will be about 1 to 2 percent by weight and, optimally, about 1.4 to about 1.8 percent. Additionally, the thermally crystallizable oxide product may include other metal oxides which are typically added to alter or modify one or more of the properties. For example, alkaline earth metal oxides can be added; such as, for example, MgO, BaO, CaO, in amounts up to as much as 5 or 6 weight percent but, more typically in amounts of about 2 to 4 percent. Additionally, alkali metal oxides, such as, for example, sodium oxide or potassium oxides, are quite frequently included in thermally crystallizable glass compositions and they may likewise be added in forming the oxide product in accordance with the present invention. Typically, these alkali metal oxides are added in an amount less than about 2 percent. In preparing a magnesia-aluminosilicate oxide product, the composition will generally be so selected so as to correspond to a mole ratio of magnesia to alumina to silica between about 2:2:5 (1:1:2.5) to about 1:1:4.

The clear gel which is formed from the clear solution as the result of hydrolysis and condensation reactions is typically converted to the desired thermally crystallizable oxide product by the use of heat. The gel, in addition to the oxide equivalents thereof, will also contain water and free alkanol as the result of the condensation and hydrolysis reactions, and also a solvent, when employed. Additionally, although sufficient water is added into the system so as to have sufficient water to at least theoretically hydrolyze all the hydrolyzable groups in the system and, preferably, an excess of this amount is employed, it is highly likely that some of the alkoxide groups may not be hydrolyzed and, therefore, the gel likewise will include carbon in the form of the alkoxy group. Organics from the salts will also be present. Thus, in order to produce a glass-ceramic, it is first necessary to remove organics and free liquid components from the gel so as to form the oxide product. One method of converting the gel to the thermally crystallizable oxide product is to convert the gel into a so-called aerogel by replacing the liquid component of the gel with air. This, for example, may be done according to the method described by Kistler, JOURNAL OF PHYSICAL CHEMISTRY, Vol. 36, page 52 (1932). This is generally accomplished by heating the gel in a pressure vessel at a temperature at least above the critical temperature of the organic liquid components of the gel so as to vaporize and remove such liquid components and convert the gel to an aerogel. The aerogel is an extremely friable material and, preferably, the aerogel is then converted to a particulate mass having a particle size of less than about 0.2 micron and, more typically, less than 0.02 micron and, quite often, particles in the size of about 0.001 to about 0.01 micron. This particle size is easily obtained from the extremely friable aerogel by a simple, gentle, crushing or breaking-up of the aerogel into these particles. Severe or intense grinding equipment is not required because of the highly friable nature of the aeroin this case was slow so as to prevent inter-particle attachment before appreciable crystallization which, otherwise, would result in substantial particle size increase.

It will thus be seen from the above that glass-ceramic articles are formed from thermally crystallizable oxide products without using temperatures in excess of the normal liquidus temperature or normal melting temperatures. That is, when making glass ceramics corresponding to the compositions set forth by conventional techniques, it will be necessary to heat the appropriate oxide constituents to a temperature above the liquidus, to the melting point or above, whereas by the present invention glass-ceramics are produced without such high temperatures.

While the invention has been described above, modifications may be made, which pursuant to the patent statutes and laws, do not depart from the spirit and scope of the present invention.

I claim:

1. A process for forming a glass-ceramic comprising: thermally crystallizing a consolidated unitary thermally crystallizable body, said body being prepared by (1) hydrolyzing a silicon alkoxide of the formula $SiX_nY_{4-n}$, wherein X is hydrogen, phenyl or alkyls of one to six carbon atoms, Y is OR where R is an alkyl of one to six carbon atoms and wherein $n$ is 0 or 1, with less than a stoichiometric quantity of water in the presence of an effective catalytic amount of an acid hydrolysis catalyst so as to prepare a clear solution of a partially hydrolyzed silicon alkoxide; (2) reacting the partially hydrolyzed product according to the sequence of A plus B, A plus C, or B alone, so as to prepare a clear gel:
   A. a metal alkoxide so as to form a clear solution of a soluble further-hydrolyzable metallosiloxane,
   B. an aqueous solution of a metal compound which is convertible to a metal oxide so as to initially form a clear solution which subsequently converts to a clear gel,
   C. a quantity of water sufficient to hydrolyze residual alkoxy groups in the metallosiloxane so as to initially form a clear solution which subsequently converts to a gel,
   (3) heating the gel so as to substantially remove organic and free liquid components therefrom and convert said gel to an oxide product, consolidating said oxide product to a unitary body, said oxide product and said unitary body being formed at and said thermal crystallizing being done at temperatures below the normal melting temperature of an oxide composition corresponding to the composition of said oxide product.

2. The process of claim 1 wherein said oxide product is of a composition corresponding to a thermally crystallizable lithia-aluminosilicate composition.

3. The process of claim 2 wherein lithia, alumina and silica are present in mole ratios of between about 1:1:2 to about 1:1:15 respectively.

4. The process of claim 3 wherein said ratios are about 1:1:3 to about 1:1:8.

5. The process of claim 1 wherein said oxide product is a composition corresponding to a thermally crystallizable magnesia-aluminosilicate, wherein magnesia, alumina and silica are present in mole ratios of about 1:1:2.5 to about 1:1:4.

6. The process of claim 1 wherein $n$ is 0 and wherein said hydrolysis is effected with about 0.3 to about 1.5 equivalents of water per equivalent of said silicon alkoxide and wherein said hydrolysis is effected in the presence of an organic solvent.

7. A process which comprises: (A) consolidating particles of a thermally crystallizable oxide product into a unitary body, said product being prepared by:
   1. hydrolyzing a silicon alkoxide of the formula $SiX_nY_{4-n}$, wherein X is hydrogen, phenyl or alkyls of one to six carbon atoms, Y is OR where R is an alkyl of one to six carbon atoms and wherein $n$ is 0 or 1, with less than a stoichiometric quantity of water in the presence of an effective catalytic amount of an acid hydrolysis catalyst so as to prepare a clear solution of a partially hydrolyzed silicon alkoxide;
   2. reacting the partially hydrolyzed product with a metal alkoxide so as to form a clear solution of a soluble, further hydrolyzable metallosiloxane,
   3. reacting said further hydrolyzable metallosiloxane with a quantity of water sufficient to hydrolyze residual alkoxy groups in the metallosiloxane so as to form a clear solution which subsequently converts to a gel,
   4. converting said gel to a particulate oxide product,
   (B) heating said body to a temperature and for a time sufficient to thermally crystallize said thermally crystallizable oxide product to a glass-ceramic, said oxide product being formed at and said process being performed at temperatures below the normal melting temperature of an oxide composition corresponding to the composition of said oxide product.

8. The process of claim 5 wherein step 2 comprises drying said gel, crushing the dried gel to a particle size of less than about 0.2 microns and heating said crushed and dried gel to a temperature sufficient to remove residual organic components.

9. The process of claim 7 wherein $n$ is 0 and wherein said hydrolysis is effected with about 0.3 to about 1.5 equivalents of water per equivalent of said silicon alkoxide and wherein said hydrolysis is effected in the presence of an organic solvent and wherein at least part of the water reacted in step 3 is a water solution of a metal salt of an organic acid.

10. The process of claim 9 wherein said silicon alkoxide is ethyl silicate and wherein about 1 equivalent of water per about 1 equivalent of silicon alkoxide is used to effect hydrolysis and wherein said catalyst is a mineral acid.

11. The process of claim 10 wherein said solvent is ethanol and said acid is HCl.

12. The process of claim 9 wherein said oxide product is of a composition corresponding to a thermally crystallizable lithia-alumina-silicate, wherein lithia, alumina and silica are present in molar proportions of about 1:1:3 to about 1:1:8.

13. A process for forming a glass-ceramic comprising:
   A. consolidating particles having a size less than about 0.2 microns of a thermally crystallizable, oxide product into a unitary body, said product being prepared by steps which comprise:
   1. combining a silicon alkoxide of the formula $SiX_nY_{4-n}$, wherein X is hydrogen, phenyl or alkyls of one to six carbon atoms, Y is OR wherein R is an alkyl of one to six carbon atoms, and $n$ is 0 or 1, with less than a stoichiometric quantity of water in the presence of an effective catalytic amount

| | |
|---|---|
| $SiO_2$ | 67.5% |
| $Al_2O_3$ | 20.8% |
| $TiO_2$ | 1.8% |
| $ZrO_2$ | 2.0% |
| $Li_2O$ | 3.8% |
| CaO | 3.5% |
| $Na_2O$ | 0.4% |
| $K_2O$ | 0.2% |

About 120 ml. of ethanol was combined with about 187 grams of ethyl silicate (equivalent of about 54 grams of silica) and 16 ml. of water was added when a clear solution had been obtained. Four drops of 1 N HCl solution was added and the solution heated to about 60°C. to produce a clear solution of a partially hydrolyzed ethyl silicate. After cooling to about 40°C., 80 grams of aluminum secondary butoxide, 5.1 grams of titanium isopropoxide and 4.2 grams of zirconium isopropoxide were added, a clear solution resulting which contained a soluble, further hydrolyzable metallosiloxane. The addition of these alkoxides represents the addition of the equivalent of about 16.5 grams of alumina, about 1.5 grams of titania, and about 1.6 grams of zirconia. About 7.5 grams of lithium carbonate (about 3.1 grams of $Li_2O$), 8.8 grams of calcium acetate (about 2.8 grams of CaO), 0.85 gram of sodium acetate (about 0.3 gram $Na_2O$) and 0.32 gram of potassium acetate (about 0.15 gram $K_2O$) were dissolved in a mixture of about 75 ml. of water and 25 ml. of acetic acid and this solution was then added to the solution containing the soluble, further hydrolyzable metallosiloxane previously prepared. A clear solution of all components formed, which solution then gelled to a clear gel in about 30 minutes. This clear gel was then placed in a high pressure reactor under a pressure of about 500 p.s.i.g. nitrogen and then heated to a temperature of about 280°C., the final pressure being about 3,000 p.s.i.g. The reactor was then vented to atmospheric pressure and allowed to cool. A translucent, extremely friable aerogel was obtained, which aerogel was then placed in a plastic bottle with approximately 3/4 inch alumina cylinders therein and crushed for about 3 hours by rotating the plastic bottle. To be certain that the resultant product was substantially free of organic and free liquid components, the product was heated to 400°C. for 3 hours. An electron micrograph of this product showed it to be of a particulate mass generally composed of uniform, agglomerated particles having a diameter of about 0.01 micron.

The particulate product was then pressed into pellets of a diameter of about 1¼ inches, using a steel die at 600 p.s.i. and at room temperature. The consolidated, unitary article was translucent and quite strong. These pellets were then heated for 4 hours at 800°C. and at this stage they were substantially transparent and X-ray analysis indicated they were amorphous. Further heating at 800°C. for a total of about 18 hours, or at 900°C. about 1 to 1½ hours, caused crystallization and X-ray analysis indicated high quartz solid solution was the principle phase. These pellets were substantially transparent and nonporous. That is, in this instance, they had a density of about 99 percent of theoretical.

EXAMPLE 2

A gel, which contained on an equivalent oxide basis, the following metal oxides, was prepared as set forth below:

| | |
|---|---|
| $SiO_2$ | 52.9 grams |
| $Al_2O_3$ | 28.0 grams |
| $TiO_2$ | 1.1 grams |
| $ZrO_2$ | 6.6 grams |
| MgO | 11.4 grams |

Ethyl silicate (183 grams) was hydrolyzed in ethanol (130 ml.) with about 11 grams of water in the presence of about three drops of 1 N $HNO_3$ by heating to about 60°C. to produce a clear solution of a partially hydrolyzed ethyl silicate. After allowing the solution to cool to about room temperature, 135 grams of aluminum secondary butoxide and about 3.9 grams of titanium isopropoxide and about 20.5 grams of zirconium tertiary butoxide were added to the solution. There was an exothermic reaction and a clear solution resulted, which clear solution contained a soluble further hydrolyzable metallosiloxane. To this solution there was then added a solution prepared by dissolving 60.6 grams of tetrahydrated magnesium acetate in about 180 ml. of water and 25 ml. of acetic acid. A clear solution again was obtained, which solution then gelled to produce a stiff, clear, homogeneous gel. This gel was broken up and then positioned in a flat tray and dried at 60°C. for about 64 hours. The resulting dried gel, which was extremely friable, was then gently crushed in a ceramic jar with alumina cylinders by rotating the jar for about 3 hours to produce a fine, particulate product. This product was then heated to a temperature of about 400°C. and held there for about 24 hours to produce a thermally crystallizable oxide product having a surface area of about 400 square meters per gram and particles less than 0.2 micron in diameter.

This particulate, thermally crystallizable product was then compacted into pellets as described above, using a pressure of about 20,000 psi. The pellets were heated over night at about 800°C. and then the temperature raised to about 900°C. After about 30 minutes at this temperature, the samples were translucent and nonporous on the surface. X-ray analysis indicated that they were substantially amorphous. After 2 hours at 900°C., the samples remained the same but X-ray analysis indicated that crystallization had taken place to produce a glass-ceramic unitary body, the principal phase being high quartz solid solution.

EXAMPLE 3

A thermally crystallizable particulate product as produced in Example 2 was intimately mixed with an equal weight of water for about 30 minutes and the resulting thick slip was then cast onto a Teflon coated sheet to form slabs about 0.1 inch thick. After air-drying at room temperature over night, the samples were heated according to the schedule set forth for the pellets in Example 2, resulting in the formation of translucent glass-ceramic sheets. The glass-ceramics of Examples 2 and 3 generally had a density of about 98 or 99 percent of theoretical.

EXAMPLE 4

The procedure of Example 1 was repeated except the gel was heated as described in Example 2 to produce a particulate, thermally crystallizable oxide product having particle sizes less than 0.2 micron. This powder was then heated for about 24 hours at 700°C. and 24 hours at 800°C. then about 6 hours at 900°C. A free-flowing small particle size glass-ceramic was produced which, by X-ray analysis, was shown to contain high quartz solid solution as the principal phase. The heating of a mineral acid hydrolysis catalyst so as to form a clear solution of a partially hydrolyzed silicon alkoxide having residual OR groups, 2. reacting said clear solution of a soluble, partially hydrolyzed silicon alkoxide with a metal alkoxide so as to form a clear solution of a soluble, further hydrolyzable metallosiloxane, 3. reacting said clear solution of a soluble, further hydrolyzable metallosiloxane with an additional quantity of water, said additional quantity of water being sufficient to hydrolyze said further hydrolyzable metallosiloxane so as to form a solution which converts to a gel structure containing a cross-linked metallosiloxane, 4. drying the gel, 5. crushing the dried gel so as to produce a particulate mass having a particle size of less than about 0.2 microns, 6. heating said particulate mass to a temperature of about 300° C. to about 500° C. for at least about 1 hour so as to remove residual organic components therefrom and form said oxide product, B. heating said body to a temperature and for a time sufficient to thermally crystallize said thermally crystallizable precursor to a glass-ceramic, said process being performed at temperatures below the normal melting temperature of an oxide composition corresponding to the composition of said oxide product.

14. The process of claim 13 wherein at least part of said additional water which is reacted in Step 3 is a water solution of a metal salt of an organic acid which is convertible to a metal oxide.

15. The process of claim 14 wherein $n$ is 0 and wherein the amount of water which is combined with said silicon alkoxide is about 0.3 to about 1.5 equivalent per equivalent of silicon alkoxide and where said combining is done in the presence of a $C_1$ to $C_3$ alcohol.

16. A process for forming a glass ceramic which comprises thermally crystallizing a consolidated unitary thermally crystallizable body, said thermally crystallizable body being prepared by:

1. heating a silicon alkoxide of the formula $SiY_4$ wherein Y is OR with R being an alkyl of one to six carbon atoms with less than a stoichiometric quantity of water in the presence of an effective catalytic amount of an acid hydrolysis catalyst so as to prepare a clear solution of a partially hydrolyzed silicon alkoxide, 2. reacting the partially hydrolyzed product of step 1 with a metal alkoxide so as to form a solution of a soluble, further hydrolyzable metallosiloxane, 3. reacting said further hydrolyzable metallosiloxane with an additional quantity of water, said additional quantity of water being sufficient to hydrolyze residual alkoxy groups in the metallosiloxane so as to form a solution which converts to a gel, 4. heating said gel so as to form an oxide product, consolidating said oxide product to a unitary body, said oxide product and said unitary body being formed at and said thermal crystallization being performed at temperatures below the normal melting temperature of an oxide composition corresponding to the composition of said oxide product.

17. The method of claim 16 wherein said silicon alkoxide is silicon tetraethoxide and wherein at least part of said additional quantity of water is a water solution of a metal salt which is decomposable to a metal oxide and further wherein said hydrolysis catalyst is a mineral acid.

* * * * *

UNITED STATES PATENT OFFICE
CERTIFICATE OF CORRECTION

Patent No. 3,791,808            Dated February 12, 1974

Inventor(s) Ian M. Thomas

It is certified that error appears in the above-identified patent and that said Letters Patent are hereby corrected as shown below:

Column 4, line 55 after Al insert a comma.

In Column 6, line 14, delete the semicolon and substitute a comma.

In line 1 of Claim 8: "Claim 5" should read --Claim 7--; and "Step 2" should read --Step 4--.

Signed and sealed this 21st day of MAY 1974.

(SEAL)
Attest:

EDWARD M. FLETCHER, JR.            C. MARSHALL DANN
Attesting Officer                    Commissioner of Patents